UNITED STATES PATENT OFFICE.

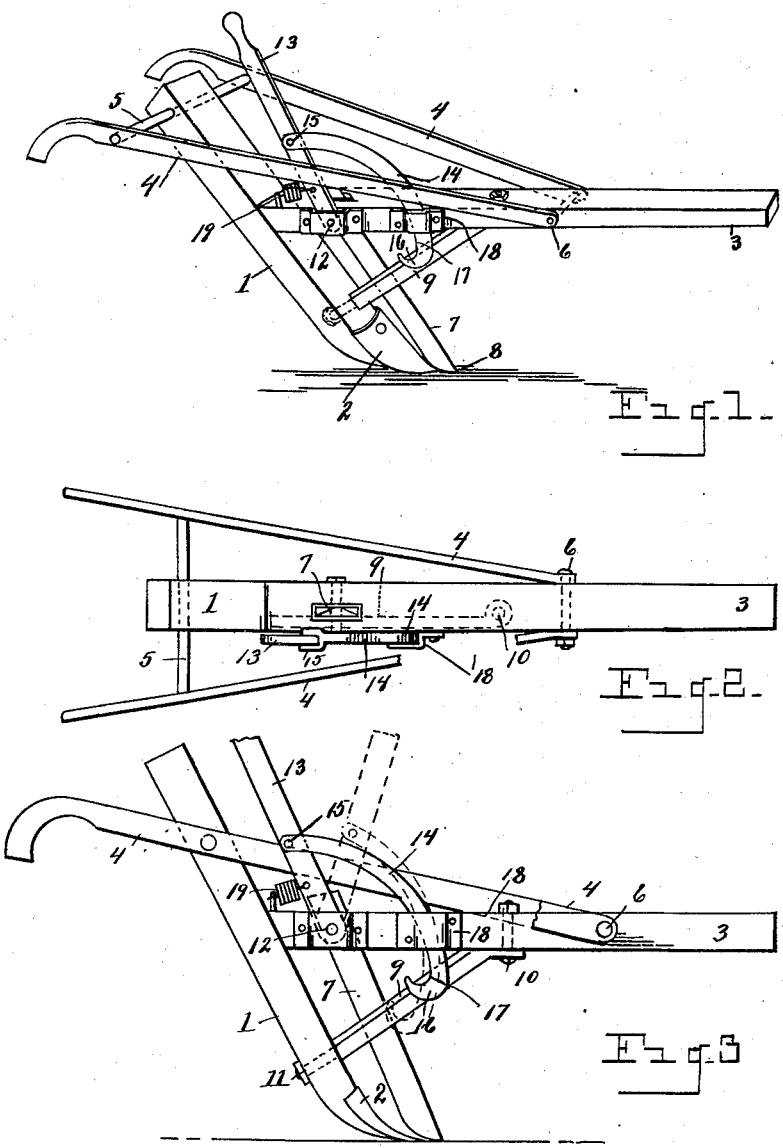

AMOS H. LAUGHLIN, OF TARIFF, WEST VIRGINIA.

PLOW.

SPECIFICATION forming part of Letters Patent No. 663,032, dated December 4, 1900.

Application filed April 4, 1900. Serial No. 11,431. (No model.)

*To all whom it may concern:*

Be it known that I, AMOS H. LAUGHLIN, a citizen of the United States, residing at Tariff, in the county of Roane, State of West Virginia, have invented certain new and useful Improvements in Plows; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to plows especially designed for plowing new land or rooty ground; and it consists in the construction and arrangement of parts hereinafter fully set forth, and pointed out particularly in the claims.

The object of the invention is to provide simple and efficient means for cutting roots encountered by the plow and preventing the stalling of the plow by an accumulation upon the plow-point or in advance thereof. This object is attained by the machanism illustrated in the accompanying drawings, in which—

Figure 1 is a perspective view of a plow embodying my invention. Fig. 2 is a plan view thereof. Fig. 3 is a side elevation, parts being broken away.

Referring to the characters of reference, 1 designates the standard, carrying the plow-point 2 at its lower end.

3 designates the plow-beam, which is securely mortised to the standard 1.

4 designates the handles, which are united at their rear ends by a cross-bar 5 extending through the upper end of the standard, the forward end of said handles being secured by means of a transverse bolt 6 to the opposite sides of the plow-beam.

7 designates the cutter, the upper end of which is secured in a mortise in the plow-beam and which extends downwardly and forwardly in advance of the plow-point. Said cutter is sharpened on its forward or upper edge and is pointed, as at 8, at its lower end, and is made to terminate on a line with the plow-point and adjusted to stand in advance thereof.

9 designates the colter, the upper end of which is secured to the under face of the plow-beam by a bolt 10, passing therethrough. Said colter extends rearwardly and downwardly, so as to cross the cutter nearly at right angles. The lower end of the colter is reduced and passed through the standard and receives upon its projecting end a nut 11, whereby it is firmly retained in place. The colter 9 stands contiguous to the cutter 7 and is sharpened on its under edge and so arranged with respect to the cutter that their cutting edges form a corner at their point of crossing.

Pivoted at 12 to the side of the plow-beam is a lever 13, which projects upwardly within reach of the driver.

14 designates a curved arm pivoted at 15 to the lever 13 and extending downwardly in the arc of a circle, its lower end being provided with a hook 16, whose upper edge is sharpened, as at 17.

18 designates a guide-plate, which is bolted to the side of the plow-beam and forms a way between its inner wall and the face of said beam adapted to confine the curved arm 14, and in which said arm is adapted to slide. The arm 14 is of such length as to enable its lower end to be thrown downward below the line of the colter 9 at its point of crossing the cutter 7, so that the hook 16 on said arm may be made to engage a root or other obstruction lying against said cutter, thereby enabling said root to be severed by the edge 17 of the hook of said arm through an operation of the lever 13, as will be understood.

In the operation of this plow the cutter 7, traveling in advance of the plow-point, engages and severs the roots in its path. When a root of unusual toughness is encountered, it will slide upward on said cutter and may not be severed thereby until it reaches the lower edge of the colter 9, when, as a rule, the action of the colter and cutter will serve to sever the root. In cases where the root is unusually large and strong the edges of the colter and cutter may not be sufficient to sever it, when the curved arm 14 is employed. By a forward movement of the lever 14 the hooked end of said arm is projected downwardly, so as to engage the root lying in the angle between he colter and cutter, when by a sharp pull upon said lever the edge 17 of the hook portion of said arm is caused to draw across said root and sever it, thereby freeing the plow.

Attached to the lever 13 at one end and to the plow-beam at the other is a retracting coiled spring 19, whose tension is exerted to draw the lever rearwardly when not in use, thereby holding the hooked end of the curved arm in its raised or normal position until its services are required.

Having thus fully set forth my invention, what I claim as new, and desire to secure by Letters Patent, is—

1. In a plow, the combination with the beam, standard and plow-point, of a cutter mounted in the beam and extending downwardly at an angle in advance of the plow-point, a colter sharpened on its lower edge crossing said cutter nearly at right angles thereto, the ends of said colter being secured in the plow-beam and standard respectively.

2. The combination with a plow-beam, standard and plow-point, of a cutter having a sharpened forward edge and standing in advance of the plow-point, a colter having a sharpened lower edge crossing said cutter nearly at right angles thereto, a curved arm having a sharpened hook at its lower end adapted to be moved to a positon adjacent the meeting edge of said colter and cutter and a lever for actuating said arm.

I testimony whereof I sign this specification in the presence of two witnesses.

AMOS H. LAUGHLIN.

Witnesses:
JOHN F. LEWIS,
HENRY TRUMAN.